Nov. 28, 1944.  E. H. SHAFF  2,364,004
FLUID OPERATED MECHANISM
Filed Nov. 3, 1942
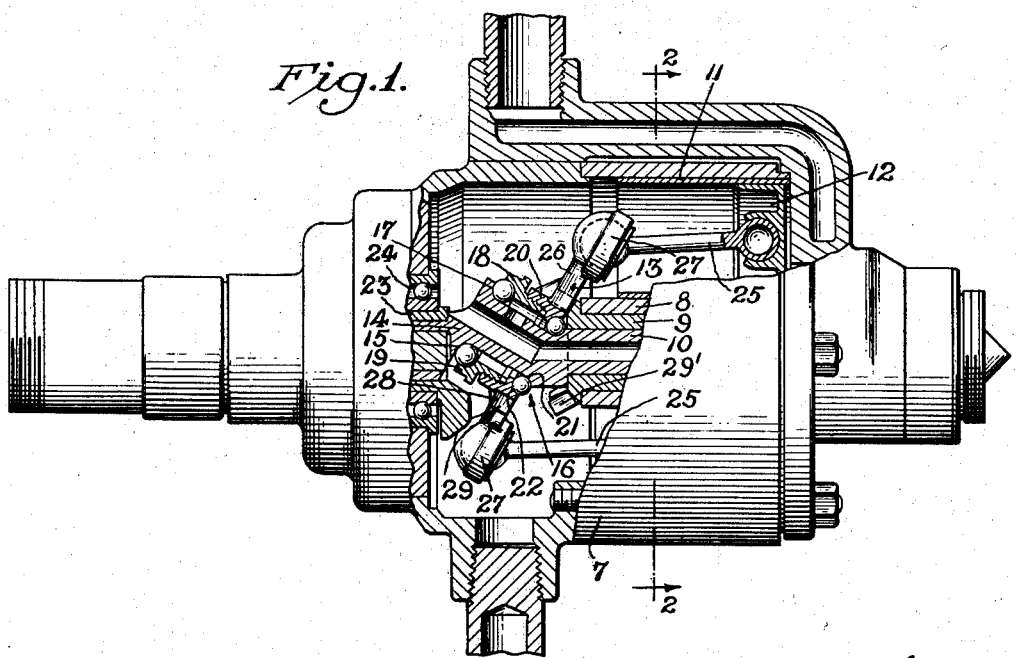
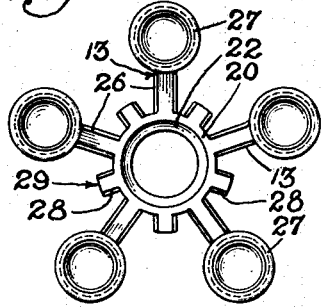
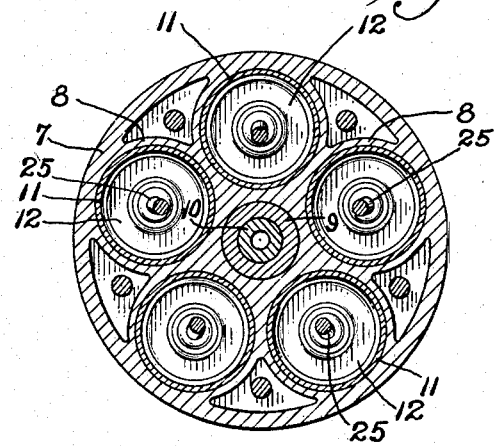
Inventor
Ernest H. Shaff
BY
Parker, Carter, Pitzner & Hubbar
Attorneys.

Patented Nov. 28, 1944

2,364,004

UNITED STATES PATENT OFFICE 2,364,004

FLUID OPERATED MECHANISM

Ernest H. Shaff, Spring Lake, Mich., assignor to Keller Tool Company, a corporation of Michigan Application November 3, 1942, Serial No. 464,339

9 Claims. (Cl. 74—60)

The invention pertains to fluid operated motors or like mechanisms of the type disclosed in my prior Patent No. 1,781,132, issued November 11, 1930, and in that instance applied to the operation of a portable pressure fluid actuated tool. As disclosed in said patent, the mechanism comprises a shaft mounted coaxially of an annular casing and having a crank arm rigid with and inclined relative thereto so that in the rotation of the shaft the arm describes a cone. A crank plate journaled on the axis of the crank arm is mounted for rocking or wobbling motion under the action of a series of pressure fluid actuators consisting of cylinders and pistons operatively connected with the crank plate at circumferentially spaced points. The plate being held against rotation, a wobbling motion is imparted thereto through the successive operation of the actuators, and such motion is transmitted through the crank arm to a driven shaft carrying the tool to be operated.

The present invention concerns primarily a motion transmitting mechanism having an improved means for holding the crank plate against rotation while permitting the aforesaid wobbling motion, to the end that the efficiency of the tool may be increased substantially.

In my prior patent, the means for holding the crank plate against rotation comprises two standard intermeshing bevel gears, one being a stationary gear mounted on the axis of the shaft and the other rigid with the crank plate. The use of standard bevel gearing involved the adoption of pitch cone angles conforming accurately to the relative angular disposition of the axes of the gears and this in turn necessitated the disposition of the crank plate forwardly along the axis of the crank arm. As a result, the center of gravity of the plate and the parts carried thereby was offset in the same direction relative to the axis of the shaft as the crank arm itself. The primary object of the present invention is to provide an improved construction and arrangement with the center of gravity of the crank plate and parts thereon offset from the axis of the shaft but in a direction opposite the crank arm whereby to compensate in large measure for the out-of-balance condition inherent in the employment of a crank arm.

Another object is to provide an improved form of gearing for holding the crank plate against rotation during the wobbling motion, such that the necessity for strict adherence to certain pitch cone angles is avoided.

In the accompanying drawing, wherein I have illustrated a preferred embodiment of my invention:

Figure 1 is a longitudinal sectional view partially in elevation, showing a pressure fluid actuated tool embodying my invention.

Fig. 2 is a transverse sectional view taken in the plane of line 2—2 of Fig. 1 (same as 11—11 of the patent, but looking in the opposite direction).

Fig. 3 is an elevational view of the crank plate detached and embodying one of the gear elements.

Referring first to Fig. 1 of the drawing, the tool shown by way of illustration comprises an annular casing 7 having a central bearing 8 in which is fixed a sleeve 9 rotatably receiving a shaft 10. A plurality of pressure fluid actuators, herein five, are mounted in circumferential series in the casing about the axis of the shaft 10. Each comprises a cylinder 11 and a piston 12. Under the control of suitable valve mechanism forming no part of the present invention and therefore not herein shown, the pistons are actuated to impart successive impulses to a thrust member 13 journaled about the axis of a crank arm 14 rigid with the shaft 10 and inclined relative thereto, the angle of inclination being, in the present instance, about thirty degrees.

The thrust member constitutes a part of the improved motion transmitting mechanism of the present invention. As in the case of said prior patent, the member embodies a series of cranks for successive cooperation with the crank arm 14 on the shaft as set forth in said prior patent. Herein the member is in the form of a skeleton plate or spider (Fig. 3) supported upon the crank arm through the medium of two sets of bearing balls respectively designated generally 15 and 16. The balls 15 engage an inner race 17 integral with the forward end of the crank arm 14 and an outer race 18 formed on a bushing 19 which is screw threaded into a cylindrical hub 20 of the spider 13. The bearing balls 16 engage with an inner raceway 21 formed at the base of the crank arm 14 and an outer raceway formed in a central annulus 22 of the spider (Fig. 3). It will be observed that the two sets of bearing balls are thus disposed at opposite ends of a bearing sleeve projecting forwardly from the annulus 22 and formed by the hub 20 of the annulus and the interfitting bushing 19. Axially alined with the shaft 10 and formed integral with the forward end of the crank arm is a tubular member 23 suitably supported in the forward wall of the casing 7 by means including a ball bearing 24.

The circumferentially arranged actuators impart their successive thrusts to the spider 13 through the medium of connecting rods 25 having spherical heads at opposite ends respectively socketed in the pistons 12 and in the periphery of the spider. As successive impulses are transmitted to the spider, it is held against rotation by two coacting gear elements respectively rigid with the stationary sleeve 9 and the crank plate.

The present invention concerns the construction and arrangement of these cooperating gear elements, and more particularly in the use of a rack type gear element formed in this embodiment by making the thrust member in the form of a spider. Thus the spider comprises, in addition to the central annulus 22, a plurality of arms 26, one for each of the actuators, the outer ends of the arms being formed with sockets 27 to receive the bearing balls of the connecting rods 25. In addition to the arms 26, the spider comprises a series of short arms 28 arranged midway between the longer arms 26 and forming with the inner end portions of the long arms the teeth of a circular rack generally designated 29. Coacting with this rack is a stationary bevel gear element formed by an annular series of teeth 29' integral with the forward end of the sleeve 9.

As first above set forth, in the prior construction, the gear element corresponding to the circular rack 29 was in the form of a standard bevel gear which made it necessary that the gear element occupy a position along the crank arm 14 advanced from the base of the arm to such an extent that the center of gravity of the crank plate assembly was offset relative to the axis of the shaft 10 in the same direction as the crank arm. I have found that by the use of a circular rack in the place of the standard type bevel gear, strict adherence to certain definite pitch cone angles is avoided and the plate may occupy a position relative to the crank arm such that the center of gravity of the assembly is offset relative to the axis of the shaft in a direction opposite to that of the crank arm, thereby compensating in large part for the out-of-balance condition incident to the use of a crank arm. In this connection it will be observed that the arms 26 and 28 project radially from the annulus and are therefore disposed substantially in the plane of the rear set of bearing balls 16. The bearing sleeve projecting forwardly from the annulus is composed simply of the hub portion 20 and bushing 19 and is accordingly of comparatively light weight construction. Thus the center of gravity of the entire thrust member is shifted rearwardly, with the result that the rear set of bearing balls may be disposed on a center offset from the axis of the shaft 10 in a direction opposite the crank arm 14. As a result, I have been able to reduce very substantially the amount of vibration with a consequent increase in the efficiency of the tool by approximately twenty percent. Moreover, by the use of a skeleton crank plate or spider of the type herein employed, it has been possible to reduce substantially the weight of the crank assembly. Also, the skeleton form is advantageous in that it offers less resistance to movement through the grease which in use is packed in the casing.

I claim as my invention:

1. A fluid operated mechanism of the character set forth, comprising, in combination, a rotatably mounted shaft, a crank arm rigid with and disposed at an angle to the shaft, a thrust member comprising a central annulus forming a bearing journaled on the axis of said crank arm and a plurality of radial arms integral with said annulus and cooperating to form a circular rack, a stationary gear element mounted on the axis of rotation of said shaft and meshing with said rack to hold said member against rotation, and means for imparting a wobbling motion to said member and a rotary motion to said shaft comprising a series of actuators disposed about the axis of the shaft and operatively connected with certain of the arms of said spider.

2. A fluid operated mechanism comprising, in combination, a casing having a circular series of cylinders disposed in parallel relation about a central axis, a shaft rotatably mounted on said axis, pistons in said cylinders, a crank arm rigid with said shaft and inclined relative thereto, a skeleton crank plate having a central annulus journaled on said crank arm, rods connecting said pistons with said crank plate at circumferentially spaced points, a non-rotary bevel gear element disposed on the axis of said shaft, said annulus having integral therewith a plurality of arms with which said rods are connected, and intervening short arms also integral with the annulus and cooperating with the first mentioned arms to form a circular rack meshing with said stationary gear element.

3. A fluid operated mechanism comprising, in combination, a rotatably mounted shaft, a crank arm rigid with the shaft and inclined relative thereto, a crank plate journaled on the axis of the crank arm and disposed substantially at the base thereof, two cooperating gear elements one rigid with the crank plate and the other fixed about the axis of said shaft, one of said gear elements being in the form of a circular rack, a series of cylinders disposed about the axis of said shaft, and pistons in said cylinders having thrust balls connected with said crank plate at circumferentially spaced points, said rack being disposed substantially in the same plane as the centers of said thrust balls.

4. A fluid operated mechanism comprising, in combination, a rotatably mounted shaft having an inclined crank arm, a thrust member journaled on said arm and comprising a central annulus forming a bearing and having integral therewith a series of circumferentially spaced crank arms and intermediate arms cooperating to form a circular rack, a non-rotary bevel gear mounted on the axis of said shaft, and a series of actuators respectively connected to the crank arms of said thrust member.

5. A fluid operated mechanism comprising, in combination, a circular series of cylinder and piston units each comprising a piston rod with a thrust ball on its outer end, a centrally mounted shaft having an inclined crank arm rigid therewith, a stationary member providing an annular series of bevel gear teeth encircling said shaft, a thrust member, and ball bearing means supporting said member on said crank arm, said shaft having an inner ball race formed integral therewith at the base of said crank arm, and said thrust member comprising a central annulus forming an outer ball race, a series of circumferentially spaced crank arms connected with said piston rods and forming sockets for coaction with the thrust balls on said rods, and a series of intervening relatively short arms cooperating with the first series of arms to form a circular rack for coaction with said stationary gear teeth.

6. A fluid operated mechanism comprising, in combination, a circular series of cylinder and piston units each comprising a piston rod with a thrust ball on its outer end, a centrally mounted shaft having an inclined crank arm rigid therewith, a stationary member providing an annular series of bevel gear teeth encircling said shaft, a thrust member comprising a central annulus, a series of circumferentially spaced sockets for coaction with said thrust balls, and a circular rack for coaction with said bevel gear teeth, means for retaining said thrust balls in said sockets, and means rotatably supporting said thrust member on said crank arm including a series of bearing balls interposed between the annulus and the crank arm at the base thereof, said rack, bearing balls and thrust balls being disposed substantially in a common plane.

7. A crank unit for a fluid operated mechanism having a circular series of pistons, a centrally mounted shaft with an inclined crank arm thereon and a central stationary gear element, said unit comprising an annulus forming a central bearing member and having integral therewith a series of circumferentially spaced crank arms for connection with said pistons and intermediate relatively short arms cooperating with the crank arms to form a circular rack for coaction with said stationary gear element.

8. A motion transmitting mechanism of the character set forth comprising, in combination, a rotatably mounted shaft, a crank arm rigid with the shaft and inclined relative to the axis thereof, a thrust member having a central annulus, a bearing sleeve rigid with and projecting forwardly from said annulus in encircling relation to said crank arm, two sets of bearing balls interposed between said crank arm and said sleeve at opposite ends of the latter, the rear set of balls being arranged in a circular series between the annulus and the base of the crank arm upon a center offset relative to the axis of said shaft on the side thereof opposite the crank arm, a stationary bevel gear element mounted on the axis of rotation of the shaft with its pitch circle disposed in a plane perpendicular to the axis of the shaft, and a series of arms projecting radially from said annulus and forming a circular rack meshing with said bevel gear element to hold the thrust member against rotation.

9. A fluid operated mechanism comprising, in combination, a rotatably mounted shaft, a crank arm rigid with the shaft and inclined relative to the axis thereof, a plurality of cylinders arranged in a circular series about said shaft, pistons in said cylinders having forwardly extending rods, a thrust member having a central annulus with a plurality of radial thrust arms connected at their outer ends to the forward ends of the piston rods, a bearing sleeve rigid with and projecting forwardly from said annulus in encircling relation to the crank arm, two sets of bearing balls interposed between said crank arm and said sleeve at opposite ends of the latter, the rear set of balls being arranged in a circular series between the annulus and the base of the crank arm, a stationary bevel gear element coaxial with said shaft, and a series of arms projecting radially from said annulus intermediate the thrust arms and coacting therewith to form a circular rack meshing with said bevel gear element to hold the thrust member against rotation.

ERNEST H. SHAFF.